United States Patent
Muratov et al.

(10) Patent No.: US 10,658,869 B2
(45) Date of Patent: May 19, 2020

(54) MULTI-MODE, MULTI-STANDARD WIRELESS POWER TRANSMITTER COIL ASSEMBLY

(71) Applicant: MediaTek Inc., Hsin-Chu (TW)

(72) Inventors: Vladimir A. Muratov, Manchester, NH (US); Patrick Stanley Riehl, Lynnfield, MA (US)

(73) Assignee: MediaTek Inc., Hsin-Chu (TW)

( * ) Notice: Subject to any disclaimer, the term of this patent is extended or adjusted under 35 U.S.C. 154(b) by 868 days.

(21) Appl. No.: 15/086,367

(22) Filed: Mar. 31, 2016

(65) Prior Publication Data

US 2016/0211702 A1 Jul. 21, 2016

Related U.S. Application Data

(63) Continuation-in-part of application No. 13/956,374, filed on Aug. 1, 2013, now Pat. No. 9,912,197.

(60) Provisional application No. 62/193,807, filed on Jul. 17, 2015, provisional application No. 61/782,637, filed on Mar. 14, 2013, provisional application No. 61/679,301, filed on Aug. 3, 2012.

(51) Int. Cl.
| | |
|---|---|
| H02J 7/00 | (2006.01) |
| H01F 38/14 | (2006.01) |
| H02J 5/00 | (2016.01) |
| H02J 50/10 | (2016.01) |
| H02J 50/90 | (2016.01) |
| H02J 50/40 | (2016.01) |
| H02J 50/80 | (2016.01) |
| H02J 7/02 | (2016.01) |

(52) U.S. Cl.
CPC .............. *H02J 50/10* (2016.02); *H01F 38/14* (2013.01); *H02J 50/40* (2016.02); *H02J 50/90* (2016.02); *H02J 7/025* (2013.01); *H02J 50/80* (2016.02)

(58) Field of Classification Search
CPC .. H02J 50/10; H02J 50/90; H02J 50/40; H02J 50/80; H02J 7/025; H01F 38/14
USPC ............................................ 307/89–111; 1/1
See application file for complete search history.

(56) References Cited

U.S. PATENT DOCUMENTS

| | | |
|---|---|---|
| 6,960,968 B2 | 11/2005 | Odenaal et al. |
| 7,643,312 B2 | 1/2010 | Vanderelli |

(Continued)

FOREIGN PATENT DOCUMENTS

| | | |
|---|---|---|
| CN | 101682216 A | 3/2010 |
| CN | 101699711 A | 4/2010 |

(Continued)

OTHER PUBLICATIONS

Office Action dated Apr. 13, 2016 for co-pending U.S. Appl. No. 13/956,374.

(Continued)

*Primary Examiner* — Brandon S Cole

(74) *Attorney, Agent, or Firm* — Wolf, Greenfield & Sacks, P.C.

(57) ABSTRACT

Apparatus and methods for dual-mode wireless power transfer are described. Two power transmit coils may be configured to provide magnetic resonant and magnetic inductance wireless power transfer from a same charging area of a wireless power transmitter. The coils and magnetic backing may be arranged to provide similar power transfer performance for the two power transfer methodologies.

31 Claims, 5 Drawing Sheets

(56) References Cited

U.S. PATENT DOCUMENTS

| | | | |
|---|---|---|---|
| 7,990,103 B2 | 8/2011 | Klinghult | |
| 8,217,535 B2 | 7/2012 | Uchida | |
| 8,653,698 B2 | 2/2014 | Baarman et al. | |
| 9,130,386 B2 * | 9/2015 | Kawano | H02J 5/005 |
| 9,859,744 B2 | 1/2018 | Riehl | |
| 9,893,567 B2 | 2/2018 | Riehl | |
| 9,912,197 B2 | 3/2018 | Riehl | |
| 10,135,305 B2 | 11/2018 | Muratov et al. | |
| 2007/0222542 A1 | 9/2007 | Joannopoulos et al. | |
| 2008/0157603 A1 | 7/2008 | Baarman et al. | |
| 2008/0211320 A1 | 9/2008 | Cook et al. | |
| 2009/0102419 A1 * | 4/2009 | Gwon | H02J 7/025 320/108 |
| 2009/0230777 A1 * | 9/2009 | Baarman | H01F 38/14 307/104 |
| 2009/0284220 A1 | 11/2009 | Toncich et al. | |
| 2010/0068998 A1 | 3/2010 | Zyambo et al. | |
| 2010/0181841 A1 * | 7/2010 | Azancot | H01F 38/14 307/104 |
| 2010/0190435 A1 | 7/2010 | Cook et al. | |
| 2010/0289449 A1 | 11/2010 | Elo | |
| 2010/0308939 A1 | 12/2010 | Kurs | |
| 2011/0101790 A1 | 5/2011 | Budgett | |
| 2011/0169338 A1 | 7/2011 | Kozakai | |
| 2011/0304216 A1 | 12/2011 | Barrman | |
| 2012/0056580 A1 | 3/2012 | Kai et al. | |
| 2012/0133212 A1 * | 5/2012 | Kamata | H02J 5/005 307/104 |
| 2012/0146580 A1 | 6/2012 | Kitamura | |
| 2012/0235636 A1 * | 9/2012 | Partovi | H02J 7/025 320/108 |
| 2012/0248889 A1 | 10/2012 | Fukushi | |
| 2012/0262004 A1 | 10/2012 | Cook et al. | |
| 2013/0026850 A1 | 1/2013 | Throngnumchai et al. | |
| 2013/0043727 A1 | 2/2013 | Liu et al. | |
| 2013/0049484 A1 | 2/2013 | Weissentern et al. | |
| 2013/0062961 A1 | 3/2013 | Park et al. | |
| 2013/0257362 A1 * | 10/2013 | Lim | H02J 50/70 320/108 |
| 2014/0035383 A1 | 2/2014 | Riehl | |
| 2014/0049118 A1 | 2/2014 | Karalis et al. | |
| 2014/0117927 A1 | 5/2014 | Chateau et al. | |
| 2014/0159656 A1 | 6/2014 | Riehl | |
| 2015/0048676 A1 | 2/2015 | Joannopoulos et al. | |
| 2015/0115723 A1 | 4/2015 | Levo et al. | |
| 2015/0207333 A1 | 7/2015 | Baarman et al. | |
| 2015/0333530 A1 | 11/2015 | Moyer et al. | |
| 2015/0357827 A1 | 12/2015 | Muratov et al. | |
| 2016/0261148 A1 | 9/2016 | Riehl | |
| 2017/0018936 A1 | 1/2017 | Muratov et al. | |

FOREIGN PATENT DOCUMENTS

| | | |
|---|---|---|
| CN | 101860089 A | 10/2010 |
| CN | 102113195 A | 6/2011 |
| CN | 102130513 A | 7/2011 |
| CN | 102150340 A | 8/2011 |
| CN | 202435145 U | 9/2012 |
| CN | 104578449 A | 4/2015 |
| JP | 2012060812 A | 3/2012 |
| WO | WO 2010025156 A1 | 3/2010 |
| WO | WO 2011/122249 A1 | 10/2011 |
| WO | WO 2011135571 A2 | 11/2011 |
| WO | WO 2014054227 A1 | 4/2014 |

OTHER PUBLICATIONS

Office Communication dated Oct. 6, 2016 for U.S. Appl. No. 14/181,731.
Office Action for U.S. Appl. No. 15/155,268 dated Nov. 3, 2016.
International Search Report and Written Opinion dated Feb. 5, 2016 for International Application No. PCT/US2015/035009.
"International Search Report" dated Jun. 13, 2014 for International application No. PCT/US14/17505, International filing date Feb. 20, 2014.
Waffenschmidt, Wireless power for mobile devices. 2011 IEEE 33rd International Telecommunications Energy Conference (INTELEC). 2011:1-9.
Israelsohn, J., TI advances wireless charging with transmitter and single-chip receiver-charger ICs, Power System Designs, 2012, https://www.powersystemsdesign.com/articles/ti-advances-wireless-charging-with-transmitter-and-single-chip-receiver-charger-ics/6/2761 [retrieved Mar. 19, 2019], 3 pages.
No Author Listed, Thin and efficient power transmission, TDK Applications & Cases, April 25, 2014, https://www.tdk-electronics.tdk.com/en/373562/tech-library/articles/applications—cases/applications—cases/thin-and-efficient-power-transmission/980554 [retrieved Mar. 19, 2019], 8 pages.
U.S. Appl. No. 15/155,268, filed May 16, 2016, Riehl.
U.S. Appl. No. 14/181,731, filed Feb. 17, 2014, Riehl.
U.S. Appl. No. 14/960,541, filed Dec. 7, 2015, Muratov et al.

* cited by examiner

MULTI-MODE, MULTI-STANDARD WIRELESS POWER TRANSMITTER COIL ASSEMBLY

CROSS-REFERENCE TO RELATED APPLICATIONS

This application is a continuation-in-part of U.S. application Ser. No. 13/956,374, titled "Dual-Mode Wireless Power Receiver," filed Aug. 1, 2013, which claims priority to U.S. provisional application Ser. No. 61/782,637, titled "Dual-Mode Wireless Power Receiver," filed Mar. 14, 2013 and to U.S. provisional application Ser. No. 61/679,301, titled "Dual-Mode Wireless Power Receiver," filed Aug. 3, 2012. This application also claims priority to U.S. provisional application Ser. No. 62/193,807, titled "Multi Mode, Multi Standard Wireless Power Transmitter Coil Assembly," filed Jul. 17, 2015. These applications are hereby incorporated by reference in their entirety.

BACKGROUND

1. Technical Field

The apparatus and techniques described herein relate generally to power transmitters that can transmit power according to two or more wireless power standards.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a transmitting unit, sometimes referred to as a power transmitting unit (PTU), and a receiving unit, sometimes referred to as a power receiving unit (PRU). Typically, the PTU is used to wirelessly charge mobile devices such as smartphones, portable music players, tablets, and laptops, among other devices and applications. The mobile devices may include a PRU.

Inductive WPTS typically operate in an allocated frequency range of about one hundred to several hundred kilohertz using frequency variation as a power flow control mechanism. MI WPTS operate over short ranges (typically limited to about the diameter of a power transmit coil). In a MI WPTS, the magnetic fields decay exponentially from the power transmit coil, and are not radiated from the coil.

Resonant WPTS typically operate on a single resonant frequency using a tuned receiving antenna network and input voltage regulation to regulate output power. In typical applications, MR WPTS operate at a frequency of 6.78 MHz. At the higher frequency, electromagnetic power can radiate from the power transmit coil. Because a tuned receiving antenna is used, appreciable power transfer can occur over distances larger than the diameter of the power transmit coil.

With the introduction of WPTS into commercial products, different methodologies for power transfer using MR and MI systems evolved. Several industry committees such as the Wireless Power Consortium (WPC), the recently-merged Power Matters Alliance (PMA), and the Alliance for Wireless Power (A4WP), collectively A4WP/PMA, are working on developing international standards for consumer products based on wireless power transfer. The standards may include, for example, specifications on an amount of rectified current, voltage, and/or power generated at a PRU via the device's receiving coil and power rectification circuitry. Even though standards are being developed, MI and MR wireless power systems (operating at very different frequencies) are likely to continue to be implemented in different commercial products.

SUMMARY

Described embodiments relate to apparatus and methods for operating a dual-mode wireless power transmitter to transmit power according to two or more wireless-power transmission standards. In some embodiments, a transmitter includes a first coil configured for operation according to magnetic resonant wireless power transfer and a second coil configured for operation according to magnetic induction wireless power transfer. Magnetic backing, coil locations, and coil geometry may be arranged to improve power coupling efficiency for both modes of power transfer, reduce power coupling variations due to misalignment of transmitter and receiver coils, and to reduce differences between MI and MR power transfer.

Some embodiments relate to a multi-mode wireless power transmitter that includes a first transmit coil spanning a first area and configured for operation at a first frequency, a second transmit coil spanning a second area that is located within the first area and is smaller than the first area and wherein the second transmit coil is configured for operation at a second frequency that is at least a factor of 20 lower than the first frequency, and a platform having a designated charging area located vertically from the first transmit coil and second transmit coil, within which to place a wireless receiving device.

Some embodiments relate to a method of operating a dual-mode wireless transmitter. The method may include acts of applying a first drive signal at a first frequency to a first transmit coil that spans a first area and is vertically spaced from a platform having a designated charging area, and applying a second drive signal at a second frequency that is at least a factor of 20 lower than the first frequency to a second transmit coil that spans a second area that is located within the first area and is smaller than the first area The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. Directional and orientation references made with respect to the drawings are for teaching purposes only, and are not meant to limit directions or configurations of the described apparatus. The drawings are not necessarily drawn to scale, with emphasis instead being placed on illustrating various aspects of the techniques and devices described herein.

DETAILED DESCRIPTION

As mentioned above, electronic devices capable of wireless power transfer are likely to continue to employ one or both of magnetic resonant (MR) and magnetic induction (MI) wireless power transfer methodologies. Because these two systems are significantly different, a wireless power transmitter configured for a MR system will not provide power to a MI receiving device with any suitable efficiency. Similarly, a transmitter configured for a MI system will not provide power to a MR receiving device with any suitable efficiency. The inventors have recognized and appreciated the desirability of having a dual-mode wireless power transmitter that can transmit power to both MR and MI devices efficiently. Additionally, the inventors have recognized and appreciated that such a transmitter should be compact (e.g., a single charging area rather than separate charging areas for each standard), and provide a similar performance irrespective of the receiving system (MR or MI). For example, a user desiring to charge a mobile device with a dual-mode transmitter should experience the same charging performance when placing a MI-receiving device or a MR-receiving device in a designated charging area of the transmitter. Further, the inventors have recognized and appreciated that it is also important for the two systems to perform similarly when a receiving device (either MR or MI) is misaligned within the charging area of the power transmitter.

The inventors have recognized that providing a same experience for a single charging area poses some challenges. For example, a single charging area may involve the transmit coils being located in close proximity. When in close proximity, this can lead to coil-coil interactions, such as mutual inductive loading of one coil by the other, an effect that may degrade the performance of one or both power transmit coils. Additionally, magnetic backing that may be used for one coil may adversely affect the performance of the other coil. In view of these challenges, the inventors have conceived of and studied different coil configurations that can provide similar wireless power transfer performance for a single charging area for MR and MI systems.

Figure 1:
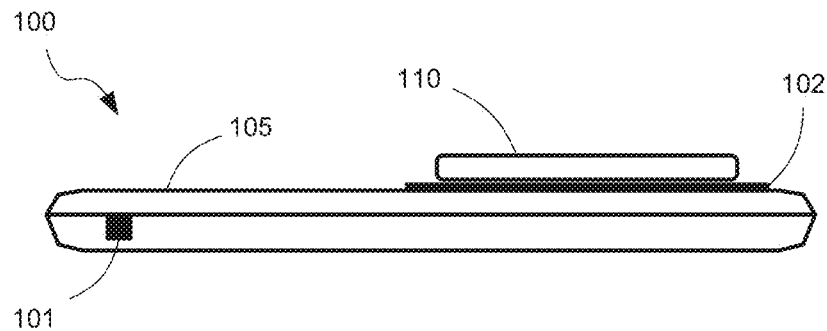
FIG. 1 depicts a dual-mode wireless power transmitter, according to some embodiments.

Referring now to FIG. 1, an example of a dual-mode wireless power transmitter 100 is depicted. A wireless power transmitter may be a low-profile electronic device that can be placed in any convenient location (e.g., on a desktop, table, countertop, night stand, in a vehicle, etc.), and may include a casing 105 that encloses electronic components such as two or more power transmit coils and at least one power converter. A wireless power transmitter may include a designated charging area 102 (e.g., a pad or marked area) identified for charging a wireless power receiving device 110. For example, a receiving device 110 placed centrally within the designated charging area 102 may be charged at a higher efficiency than if placed to a side of the charging area.

A wireless power receiving device 110 may include at least one receiving coil and be configured to be powered or charged wirelessly. According to some embodiments, a wireless power receiving device may provide a feedback signal to the wireless power transmitter 100 identifying where more or less power is required at the receiving device. In some implementations, a receiving device 110 may comprise a coil having a fixed load, which may be used for calibration or evaluation of coupling efficiency between the wireless power transmitter and a wireless power receiving coil. The fixed load may be any value between about 5 ohms and about 100,000 ohms.

When a dual-mode wireless power transmitter 100 is activated, power may be transferred wirelessly from a transmit coil of the wireless power transmitter to a receiving coil of the device 110. According to some embodiments, a wireless power transmitter may include user controls, such as On/Off buttons 101, touchpad, touchscreen, or other manually-operated controls to control the operation of the wireless power transmitter 100.

Figure 2:
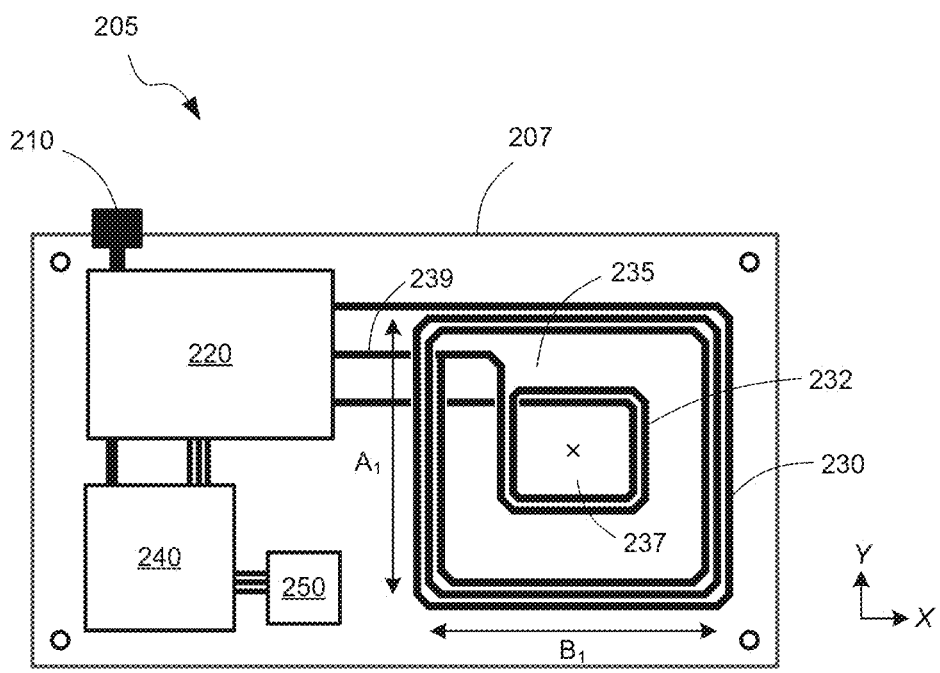
FIG. 2 illustrates some components of a dual-mode wireless power transmitter, according to some embodiments.

Further details of a dual-mode wireless power transmitter 100 are depicted in FIG. 2. According to some embodiments, the wireless power transmitter may include a circuit board 205 that includes one or more electronic components of the wireless power transmitter, such as at least one power converter 220, a processor 240 or other control circuitry, a first transmit coil 230, and a second transmit coil 232. A power converter 220 may convert power from a power source to produce an oscillating current that is applied to one or both transmit coils 230, 232. In some embodiments, the power source may be an external source (e.g., a conventional residential or commercial AC line source, such as, but not limited to, 60 Hz, 100-127 VAC). Other examples of line power sources include 60 Hz, 220-240 VAC, 50 Hz, 100-127 VAC, and 50 Hz, 220-240 VAC. In some implementations, the power source may be a DC power source from a vehicle (e.g., automotive, railway, or airplane electrical system power). A power converter may receive power through a power jack 210 and/or an extension cord that plugs into a conventional residential or commercial AC power outlet or DC power outlet of a vehicle, for example. In some implementations, a power transmitter may include a battery (not shown), which may be connected to the power converter and/or processor 240 to provide uninterruptible power. In some embodiments, a power converter 220 may include a switched-mode power supply and filtering circuitry configured to convert power from a power source to oscillating current that is applied to a power transmit coil 230, 232. The oscillating current may oscillate at a fixed frequency in compliance with wireless power transfer standards, or vary over a range of frequencies in compliance with other wireless power transfer standards. For example, the oscillating current may oscillate at approximately 6.78 MHz, though other frequencies may be used in some cases. In some embodiments, a power converter may include an inverter and one or more impedance matching networks to facilitate power transfer between the power converter 220 and a power transmit coil 230, 232. In some implementations, a power transmitter 100 may include a single power converter 220 that can be dynamically configured to drive either power transmit coil 230, 232. In some cases, a power transmitter may include two power converters, each configured to drive its respective power transmit coil.

A transmit coil 230, 232 may comprise a conductive coil having a central axis (indicated by the "x") and open area 235, 237. Each open area may have a minor diameter $A_1$ and a major diameter $B_1$ (shown only for the first coil 230). In some implementations, the minor and major diameters may be equal. Each coil may comprise one or multiple conductive turns, and may be connected to a power converter 220. A power transmit coil may have any suitable shape (e.g., square, rectangular, polygonal, circular, oval, etc.). A transmit coil 230, 232 may be formed from one or multiple wound wires, or may be patterned as one or more conductive current loops on one or more levels of a printed circuit board. An oscillating current applied to the transmit coil produces an oscillating magnetic field in the vicinity of the coil 230, 232 that can extend through the wireless power transmitter's casing 105 at the designated charging area 102.

According to some embodiments, a dual-mode wireless power transmitter includes at least a first driving circuit and power transmit coil 230 configured for MR wireless power transfer. The dual-mode wireless power transmitter may further include a second driving circuit and power transmit coil 232 configured for MI wireless power transfer. The second MI coil may be smaller than the first MR coil, and may be located within the open area 235 of the MR coil to reduce the size of the charging area 102. When the MI coil is located "within the open area of the MR coil," it may be located above or below the MR coil, and need not be in a same plane as the MR coil. In some implementations, the MR coil may have an open area 235 that is between 2 and 6 times larger than an open area 237 of the MI coil. For example, the MR coil may measure about 5.5 inches by 3 inches, and the MI coil may measure about 2 inches by 2 inches, though other sizes may be used.

According to some embodiments, a dual-mode wireless power transmitter 100 may further include a processor 240 and a signal transceiver 250. The processor may comprise a microcontroller, microprocessor, digital signal processor (DSP), field programmable gate array (FPGA), analog circuitry, logic circuitry, or a combination thereof, by way of example. The processor 240 may be in communication with at least one memory device (not shown), which may store machine-readable instructions that can be executed by the processor to adapt the wireless power transmitter 100 to execute operations related to power transmission. The memory device may include RAM, ROM, flash memory, cached memory, or any other suitable memory. The processor 240 may also communicate with the one or more power converters 220. For example, the processor may be connected to each power converter with one or more electrical connections through which power and data may be transferred. Processor 240 may manage control of the wireless power transmitter 100 by coordinating operation of, sending data to, and processing data from each power converter 220 and the transceiver 250.

In some embodiments, the transceiver 250 may comprise a radio-frequency (RF) transmitter for transmitting and receiving data signals to and from an external device (e.g., a device 110 to be charged). Transceiver 250 may be configured for Wi-Fi or Bluetooth communications, for example, though transceiver 250 is not limited to only these communication protocols. In some implementations, transceiver 250 may be configured for wired communications (e.g., via a universal serial bus). In some implementations, the transceiver may include separate transmitting and receiving chips or circuits. In some embodiments, the transceiver 250 may use a same magnetic coupling link that is used for wireless power transmission to send and receive data from a wireless power receiving device 110. Such communication processes may include, but are not limited to, "in-band communications," "load modulation," or "backscatter modulation".

Further details of coil configurations for a dual-mode wireless power transmitter are shown in FIG. 3 and FIGS. 4A-4D. According to some embodiments, a first coil 230 may be formed on a first substrate 310 (e.g., conductive traces patterned on a printed circuit board). The first coil may be configured for magnetic resonant power transfer. In some embodiments, magnetic backing material 320 may be located adjacent to the first coil 230, and may be located opposite the substrate (as shown) or on a same side of the first coil as the substrate. Any suitable magnetic permeable material may be used for magnetic backing. Examples of magnetic backing material include, but are not limited to, various ferrites such as nickel-iron and its alloys, cobalt-iron and its alloys, and silicon-iron and its alloys. In some cases, a magnetic shield may comprise one or more polymers that are used to bind compositions of one or more ferrites described above. For example, ferrite particles may be bound in a polymer and cast as a thin film or sheet of magnetic backing material. According to some embodiments, a relative magnetic permeability of the magnetic backing material 320 for the first MR coil 230 may be between approximately 60 and approximately 200. Examples of magnetic backing material having values of permeability in this range include, but are not limited to, martensitic stainless steel, nickel, carbon steel, and ferrite. Polymer composites containing these materials may also be used.

Although the term "backing" is used, the function of the magnetic material includes guiding magnetic field lines in the vicinity of the power transmit coils to improve power transfer efficiency. For example, the magnetic material may condense and guide magnetic field lines close to the bottom side of a power transmit coil, and prevent the field lines from extending into lossy materials that may be below the coils or below the dual-mode power transmitter 100.

Referring again to FIG. 3, a second coil 232 may be spaced a vertical distance $Z_1$ from the first coil 230. The second coil 232 may be configured for MI power transfer, and formed on a second substrate 310. The first and second substrate 310 may be non-magnetic (e.g., printed circuit boards). In some embodiments, there may be a second magnetic backing material 330 located adjacent to the second coil. According to some embodiments, a relative magnetic permeability of the second magnetic backing material 330 for the second MI coil 232 may be greater than approximately 400, e.g., between approximately 400 and approximately 500,000. In some implementations, the relative magnetic permeability of the second magnetic backing material 330 may be between 2 and 8 times greater than the relative magnetic permeability of the first magnetic backing material 320. Example materials having high values of magnetic permeability include, but are not limited to ferrite, ferritic stainless steel, mu metal, iron, and metglas.

Both the first magnetic backing 320 and second magnetic backing 330 may each have a minor diameter spanning approximately a minor diameter of the respective coil and a major diameter spanning a major diameter of the respective coil. According to some embodiments, a magnetic backing may not extend beyond the minor or major diameter of a respective coil by more than 10% of the coil's respective minor or major diameter.

Figure 3:
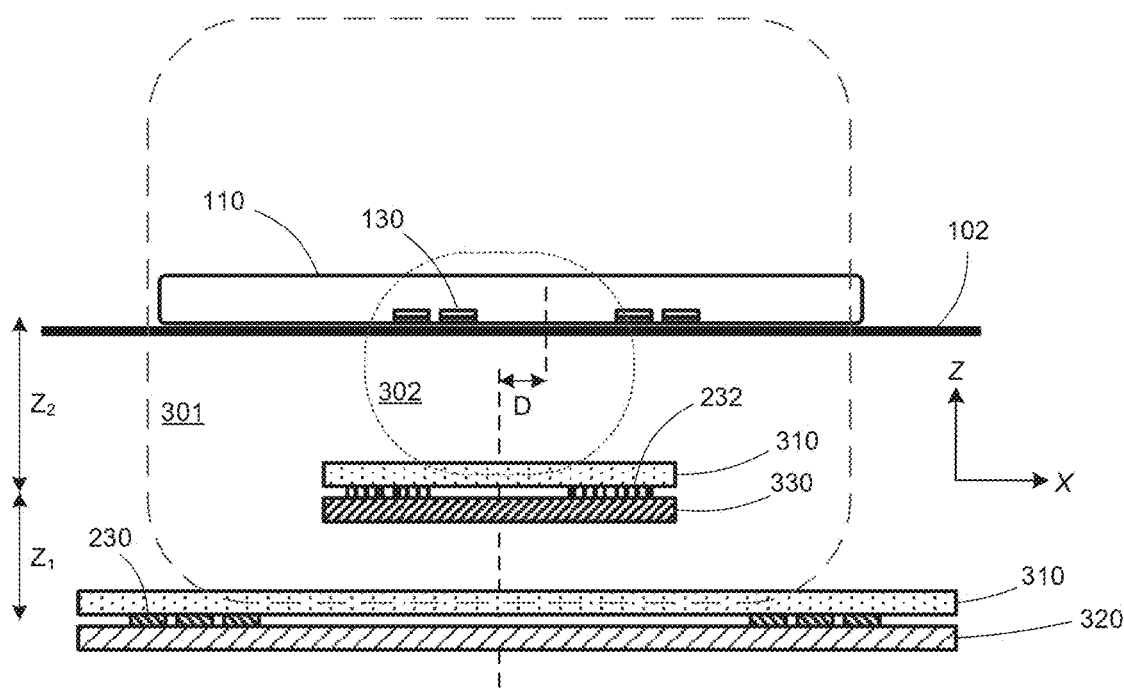
FIG. 3 depicts coil arrangements for a dual-mode wireless power transmitter, according to some embodiments.

According to some embodiments, the first transmit coil 230 and second transmit coil 232 may be aligned centrally on a same axis, indicated by the dashed vertical line in FIG. 3. In some implementations, the coils may be offset, and not aligned centrally to a same axis. There may be any number of windings in either coil, and the windings of the two coils may not overlap. If the two coils overlap, at least 90% of the open area 237 of the smaller MI coil may be contained within the open area 235 of the larger MR coil. The first coil and second coil may be housed in the dual-mode wireless power transmitter's casing 105, immediately below the designated charging area 102. The second coil may be spaced a distance $Z_2$ from the designated charging area.

When activated, the first coil 230 may be driven at a first frequency that is between 20 and 90 times higher than a second frequency at which the second coil 232 is driven. The first coil may have an associated field region 301 or power-transfer zone, in which usable electromagnetic energy extends from the coil. The second coil 232 may have a second associated field region 302 that is smaller than that of the first coil. A device 110 to be charged may be placed on the designated charging area 102 and include a receiving coil 130 housed within the device 110. The device 110 may be configured to receive power wirelessly according to MR or MI wireless power transfer. In many cases, a user may place device 110 in the designated charging area 102, such that its receiving coil 130 is misaligned by a distance D from a central axis of the power transmit coils.

Additional embodiments of coil configurations for a dual-mode wireless power transmitter are shown in FIG. 4A through FIG. 4D. According to some embodiments, a first coil 230 may be formed on a substrate 310, and its magnetic backing material 320 may be formed on an opposite side of the substrate 310 from the first coil 230. In some embodiments, the second coil 232 may be formed over and be connected (e.g., glued or otherwise bonded) to the same substrate 310. The second magnetic backing material 330 may, or may not, be included with the second coil 232.

Figure 4A:
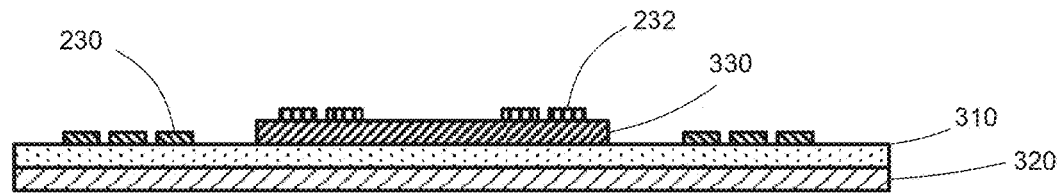
FIG. 4A depicts an arrangement of power transmit coils.

In some embodiments the second coil may be located above the first coil 230 as shown in FIG. 3 and FIG. 4A, or may be located a distance $-Z_1$ below the first coil 230. However, the inventors have recognized that it is preferable to locate the MI coil 232 closer to the designated charging area 102 than the first coil, since its power-transfer zone 302 is typically shorter range than the power-transfer zone 301 of the MR coil 230.

Figure 4B:
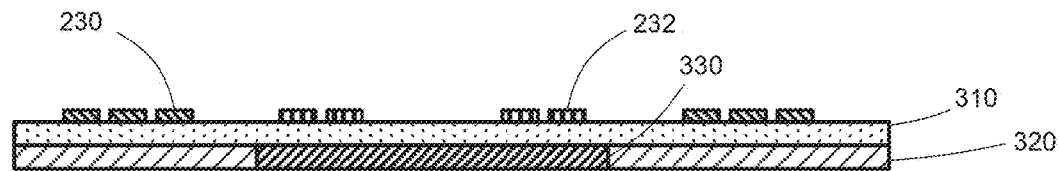
FIG. 4B depicts another arrangement of power transmit coils.

FIG. 4B depicts another coil configuration in which the first coil 230 and the second coil 232 are formed on a same substrate 310. The substrate 310 may, in some embodiments, comprise a printed circuit board, and the first and second coils may be formed from wire traces patterned on the printed circuit board. In some embodiments there may be only a first magnetic shield 320 below the two coils. In other embodiments, there may be a first magnetic shield 320 and a second magnetic shield 330 located below each coil having different relative magnetic permeabilities, as described above. For example, the first magnetic shield 320 may be annular in shape and the second magnetic shield 330 may be located within a central region of the first magnetic shield.

Figure 4C:
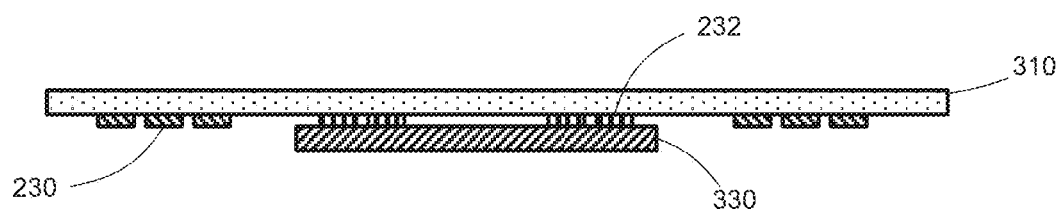
FIG. 4C depicts another arrangement of power transmit coils.

Another coil configuration for a dual-mode wireless power transmitter is depicted in FIG. 4C. In this configuration, the first coil 230 and the second coil 232 are formed on a substrate 310. A single magnetic shield 330 is located below the second coil 232, and a first magnetic shield 320 is not included.

For any of the configuration shown in FIG. 3 and FIG. 4A through FIG. 4C, the magnetic backing material for a coil may not extend more than about 10% beyond lateral dimensions of the respective coil. For example, magnetic backing material 320 for the first coil 230 may span between approximately 90% and approximately 110% of a lateral dimension (in the X or Y directions) of the first coil. In some implementations, the magnetic backing material may be annular in shape.

Figure 4D:
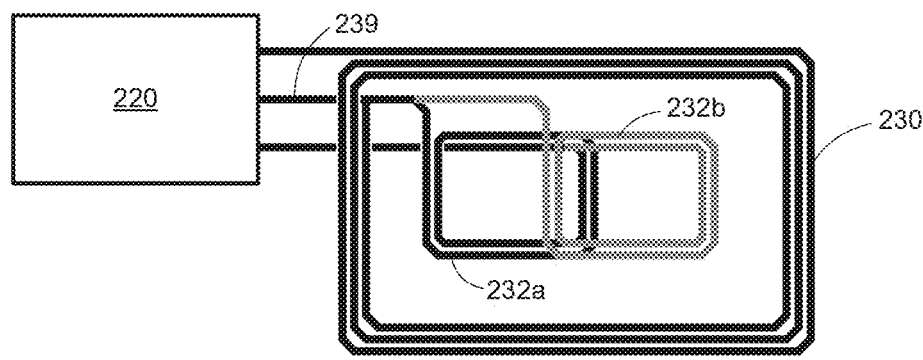
FIG. 4D illustrates a coil arrangement for a dual-mode wireless power transmitter that includes a second MI coil, according to some embodiments.

FIG. 4D depicts a plan view of a dual-mode wireless power transmitter that has a first MR coil 230 and two second MI coils 232a, 232b. In this configuration, the two MI coils may operate at a same frequency and partially overlap each other. They may be offset from each other laterally to increase a power transfer zone 302 for the MI coils.

Figure 5A:
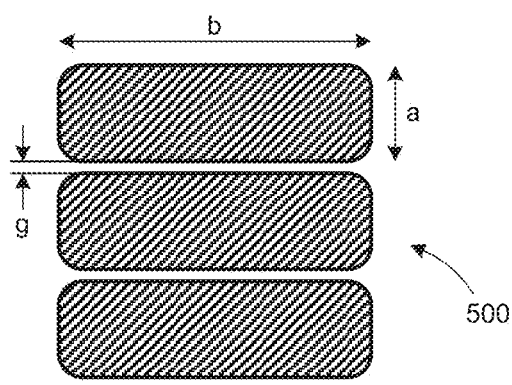
FIG. 5A depicts a tiled magnetic shield, according to some embodiments.
Figure 5B:
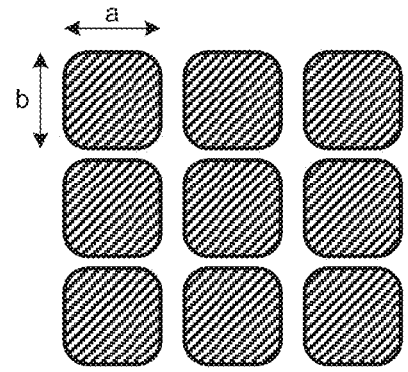
FIG. 5B depicts another tiled magnetic shield, according to some embodiments.

Additional examples of magnetic backing material configurations are shown in FIG. 5A and FIG. 5B. According to some embodiments the magnetic backing material may be a continuous film or may be tiled as shown in these drawings. In some cases the tiles may be elongated and repeated in one dimension. Each tile may have a minor lateral dimension a and a major lateral dimension b. The tiles may be spaced apart by a gap g, according to some embodiments. The gaps between the tiles may be the same or may be different. As indicated in FIG. 5B, the tiles may also be included in a two-dimensional array. In some embodiments, the magnetic backing material and tiles may comprise pre-cracked ferrite sheets.

The inventors have recognized and appreciated that the inclusion of a magnetic inductance coil 232, and possibly its magnetic shield 330, within the power-transfer zone 301 of a magnetic resonant coil 230 may detune the resonant operation of the MR coil. To compensate for the detuning, magnetic backing for the MR coil 230 may be included. Parameters of the magnetic backing may be selected to recover the resonant behavior of the MR coil and improve coupling efficiency for the MR coil.

With reference to FIG. 3, the inventors have studied the effects of different coil configurations on wireless power transfer performance. In these studies, magnetic backing was varied as well as the distance $Z_1$ between the two coils and the distance $Z_2$ between the magnetic inductance coil 232 and a receiving coil 130. Tests were carried out to evaluate wireless power transfer efficiency between the MR coil 230 and a MR receiving coil 130 as the parameters $Z_1$, $Z_2$, and magnetic backing 320 were varied.

In a first set of tests, wireless power transfer for the MR coil was evaluated with and without backing 320 for varied distances $Z_1$ and $Z_2$. Additionally, effects of misalignment of the receiving coil were studied by varying the distance D indicated in FIG. 3. To evaluate wireless power transfer efficiency, values were calculated for a "mutual voltage transformation ratio" (MVTR). The mutual voltage transformation ratio comprised a ratio of DC voltage (measured from a rectifier connected to a MR receiving coil 130 and connected across a fixed resistive load) to a root-mean-square AC voltage applied across the MR transmit coil 230. Without being bound to a particular theory, the mutual voltage transformation ratio used in the tests was defined as:

$$MVTR = \frac{V_{DC}}{V_{rms}}$$

Where the rectified DC voltage from the receiving coil was evaluated into a 100 ohm load. Other expressions and load impedances may be used to compute a value similar to the MVTR that indicates an efficiency of power coupling between the wireless power transmitter and wireless power receiver. In some embodiments, an MVTR may be evaluated into a load resistance having a value between about 5 ohms and about 100,000 ohms. However, when comparing MVTR values for different systems, the values of MVTR should be calculated for a same impedance for each system.

In a first set of trials, mutual voltage transformation ratios were calculated for a first case, in which the first transmit coil 230 had no magnetic material backing, and a second case, in which the first transmit coil 230 had a ferrite backing. For the second case, the magnetic backing did not extend more than 10% beyond the minor and major diameters of the first transmit coil 230. The results of these tests showed a significant increase in the mutual voltage transformation ratio when a magnetic shield 320 was placed adjacent to the first coil 230. The increase in the transformation ratio ranged between 6% and 20% depending upon the distances ($Z_2$ and $Z_1$) chosen.

Additionally, the inventors found that the presence of the MI coil and its shield had a negligible effect on the mutual voltage transformation ratio for the MR coil. Conversely, the presence of the MR coil and its shield had a negligible effect on the mutual voltage transformation ratio for the MI coil. When either coil was removed from the system, the difference in mutual voltage transformation ratio amounted to less than 1%. The small difference is a result of operating the MR and MI systems at markedly different frequencies (e.g., more than a factor of 20 difference). Such a large frequency difference yields a low cross induction of the two coils.

Effects of changes in the amount of misalignment D were also measured at different values of $Z_1$ and $Z_2$. To investigate misalignment, mutual voltage transformation ratios for the receiving coil were measured with the receiving coil aligned centrally to the common axis of the power transmit coils, and then displaced approximately one-half the minor diameter of the power transmit coil 230 to either side of the central axis, along a direction of the major diameter.

Figure 6A:
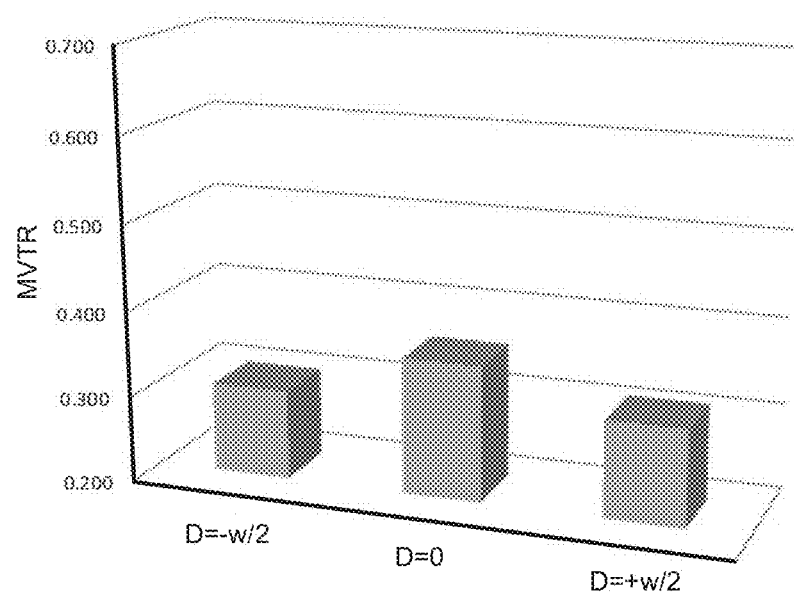
FIG. 6A illustrates variations in transformation ratio due to coil misalignment for a dual-mode wireless power transmitter having a particular coil arrangement.

The variation in mutual voltage transformation ratios due to misalignment is depicted in FIG. 6A. In this test, the MR coil 230 included a ferrite backing 320, and the MI coil 232 was located a distance $Z_1$ of approximately 12 mm from the MR coil 230. The receiving coil 130 was located a distance $Z_2$ of approximately 18 mm from the MI coil 232. For these calculations, the size of the MR coil was 5.5 inches (major diameter) by 3 inches (minor diameter), the size of the receiving coil was 2.5 inches by 2 inches, and the size of the MI coil 232 was 2 inches by 2 inches. For this case, the mutual voltage transformation ratios varied from approximately 0.30 in one misaligned configuration to approximately 0.34 in an aligned configuration, indicating a difference of about 25% in power transfer efficiency or charging rate.

Figure 6B:
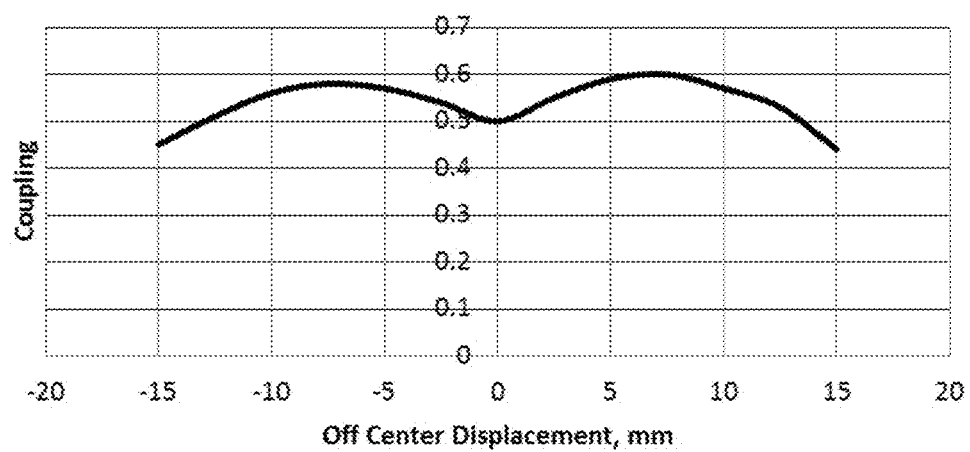
FIG. 6B illustrates variations in a coupling factor between a pair of transmit coils and a receiving coil.

Other coil configurations may have different variations in mutual voltage transformation ratios. For example, a double coil configuration for transmit coils (e.g., transmit coils 232a, 232b depicted in FIG. 4D) may have a variation in MVTR values that are proportional to the curve shown in FIG. 6B. For FIG. 6B, a coupling factor between two offset transmit coils, arranged as depicted in FIG. 4D, and a receiving coil was measured as a function of receiver coil offset from the center of the two-coil arrangement. In some embodiments, the MVTR for the coil arrangement will be proportional to the measured coupling factor. According to some embodiments, a MVTR may increase in value when the receiving coil is moved away from a center position that is aligned to a geographic center of a transmit coil arrangement, as depicted in FIG. 6B. In the illustration, a highest coupling factor is observed for a misalignment of approximately ±7.5 mm.

In some embodiments, the difference in mutual voltage transformation ratio for a receiving device (of either MR or MI type) that is misaligned by one-half a minor diameter of a transmit coil (for a corresponding MR or MI coil) may be between approximately ±25% and approximately ±50% of the mutual voltage transformation ratio when the receiving device is aligned to the transmit coil. For example, if an MVTR value is 100 when a receiving device is aligned to a transmit coil, and the difference in mutual voltage transformation ratio is −25% when misaligned, then the MVTR value will drop to 75 when misaligned. Alternatively, if the difference in MVTR is 15% when misaligned, then the MVTR may rise to 115 when misaligned. In some implementations, the difference in mutual voltage transformation ratio for a receiving device that is misaligned by one-half a minor diameter of a transmit coil may be between approximately ±10% and approximately ±25% of the mutual voltage transformation ratio when the receiving device is aligned to the transmit coil.

The changes in mutual voltage transformation ratios due to receiver coil misalignment, as indicated in FIG. 6A, were used to calculate a coupling variation value $V_c$. This value is defined as the difference between the maximum value of the three mutual voltage transformation ratios (plotted in FIG. 6A for example) and the minimum value, divided by the average value of the three transformation ratios. The maximum value is obtained when the coils are aligned, and the minimum values are obtained when the receiver coil is displaced approximately one-half the minor diameter of the power transmit coil 230 to either side of the central axis, along a direction of the transmit coil's major diameter.

Figure 7:
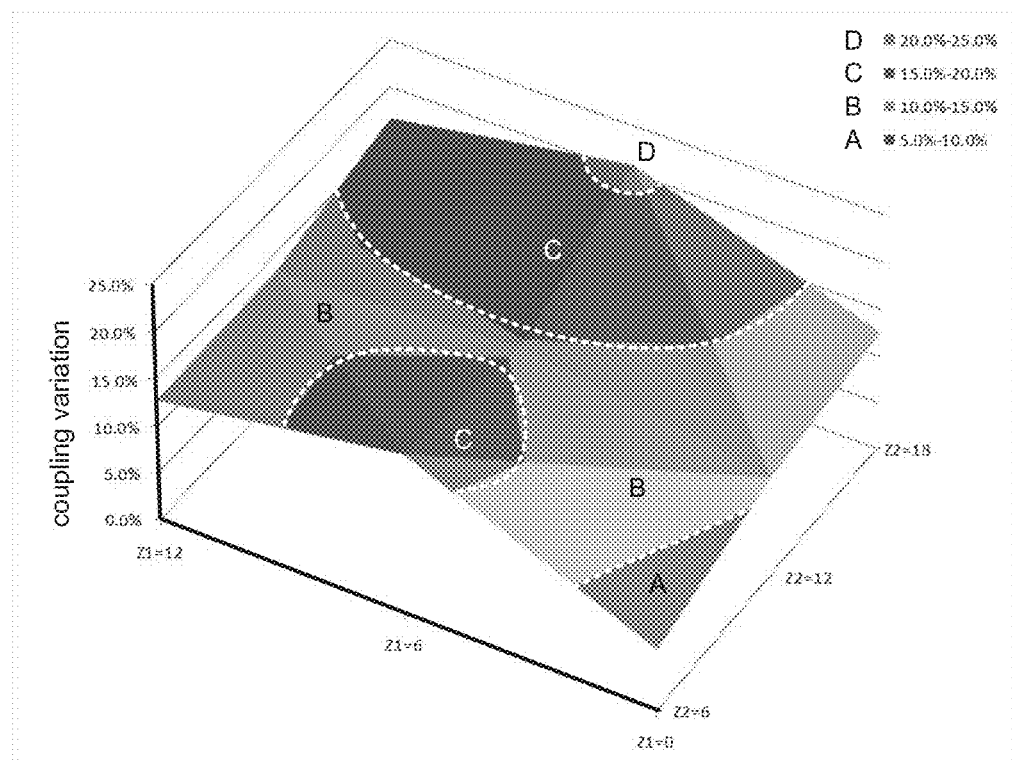
FIG. 7 illustrates calculated coupling variation for different coil configurations of a dual-mode wireless power transmitter, according to some embodiments.

Values of were determined for a number of different coil configurations ($Z_1$, $Z_2$) and are plotted in FIG. 7. For these measurements, a single MR transmit coil 230 was used and included a ferrite backing. A single MI coil 232 was also used, and the coil dimensions are given above in connection with FIG. 6A. The distance $Z_1$ was varied between 0 mm and 12 mm, while the distance $Z_2$ was varied between 6 mm and 18 mm. The plot in FIG. 7 is a three-dimensional plot that indicates the coupling variation observed for a receiving coil misalignment for the different coil configurations. Dashed white lines have been added to the plot as an aid to viewing contours of the plot.

The plot can be divided into four regions indicated as A, B, C, and D. The region A shows the lowest coupling variation for which $Z_1$ varies between about 0 mm and about 3 mm, and $Z_2$ varies between about 6 mm and about 12 mm. Although this coil configuration may yield a low coupling variation for receiving coil misalignment, it may not be a preferred configuration in some implementations. For example, by placing the MI coil 232 at or near the same location as the MR coil 230, the MI coil may not transfer as much power to a device located in the designated charging area 102 as the MR coil would, resulting in a lower mutual voltage transformation ratio and different user experience for the MI coil. To compensate for a lower mutual voltage transformation ratio, the MI coil may need to be located closer to the receiving device and its receiving coil 130 and/or its transmit power increased. Therefore, a more uniform user experience for MI and MR charging may result when the MI coil 232 is located closer to the designated charging area 102 then the MR coil 230.

Referring again to FIG. 7, it can be seen that there are regions C for which there is an appreciable increase in coupling variation due to receiver coil misalignment. These regions C may be avoided by restricting the coil configurations to the region B indicated in FIG. 7. For example, in some cases the MI coil 232 may be spaced between approximately 2 mm and approximately 4 mm from the MR coil (distance $Z_1$), and the distance $Z_2$ to the designated charging area 102 may be up to about 12 mm. In another configuration, the MI coil 232 may be spaced from the MR coil 230 by approximately 9 mm to 12 mm, while the designated charging area 102 may be spaced from the MI coil up to about 12 mm. In some implementations, the MI coil and its magnetic backing may be located a vertical distance from the MR coil that is equal to or greater than zero but less than approximately 25% of a minor diameter of the first magnetic backing 320. In some implementations, the MI coil and its magnetic backing may be located a vertical distance from the MR coil that is equal to or greater than zero but less than approximately 25% of a minor diameter of the first transmit coil 230.

By configuring the first and second power transmit coils with magnetic backing on the first coil 230 and the two coils spaced to provide coupling variations within the region B described above, a user may experience a similar charging experience (e.g., similar mutual voltage transformation ratios) of a wireless receiving device for the dual-mode transmitter 100, whether a device is aligned centrally within the designated charging area or misaligned up to approximately one-half the minor diameter of the first coil 230. In some implementations, a third or more coils having a same or similar design to the second coil may be added (as depicted in FIG. 4D) to reduce coupling variations for the coils due to misalignment of a wireless receiving device within the designated charging area. Similar charging behavior or efficiency of power coupling may be determined by measuring mutual voltage transformation ratios at various locations and comparing the measured results. In some cases, the compared mutual voltage transformation ratios may differ in value between approximately ±25% and approximately ±50% of a highest measured MVTR value between an aligned and misaligned configuration. In some embodiments, the measured mutual voltage transformation ratios may differ in values between approximately ±10% and approximately ±25% of a highest measured MVTR value between an aligned and misaligned configuration.

Additionally, similar charging behavior may occur for the second coil 232 or coils. In some embodiments, power may be adjusted to the second coil or coils to provide a similar or same mutual voltage transformation ratio for a receiving device placed centrally within the designated charging area 102 that receives power from the second coil configuration. Therefore, a user may experience a similar charging behavior (e.g., similar mutual voltage transformation ratios that are within a factor of two of each other may be measured) when a wireless power receiving device (of either MI or MR type) is placed centrally within the designated charging area 102. For some coil configurations, a user may experience a similar charging behavior when a wireless power receiving device (of either MI or MR type) is placed within a circular region of the designated charging area 102 that has a radius that is no larger than one-half the minor diameter of the power transmit coil.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. For example, an apparatus, structure, device, layer, or region recited as "including," "comprising," or "having," "containing," "involving," a particular material is meant to encompass at least the material listed and any other elements or materials that may be present.

What is claimed is:

1. A multi-mode wireless power transmitter comprising:
   a first transmit coil spanning a first area and configured for operation at a first frequency;
   a second transmit coil spanning a second area that is located within the first area and that is smaller than the first area, wherein the second transmit coil is configured for operation at a second frequency that is at least a factor of 20 lower than the first frequency; and
   a platform having a designated charging area within which to place a wireless receiving device, wherein the platform is located vertically from the first transmit coil and second transmit coil, wherein the first transmit coil and second transmit coil are configured such that a first mutual voltage transformation ratio for a first device receiving power at the first frequency and placed centrally within the designated charging area is between approximately 50% and approximately 200% of a second mutual voltage transformation ratio for a second device receiving power at the second frequency and placed centrally within the designated charging area.

2. The multi-mode wireless power transmitter of claim 1, wherein the first transmit coil and second transmit coil are configured such that a third mutual voltage transformation ratio for the first device misaligned within the designated charging area by up to one-half a minor diameter of the first transmit coil is between approximately 50% and approximately 150% of the first mutual voltage transformation ratio.

3. The multi-mode wireless power transmitter of claim 2, wherein the first transmit coil and second transmit coil are configured such that a fourth mutual voltage transformation ratio for the second device misaligned within the designated charging area by one-half the minor diameter of the first transmit coil is between approximately 50% and approximately 150% of the second mutual voltage transformation ratio.

4. The multi-mode wireless power transmitter of claim 2, wherein the first transmit coil and second transmit coil are configured such that a fourth mutual voltage transformation ratio for the second device misaligned within the designated charging area by one-half the minor diameter of the first transmit coil is between approximately 75% and approximately 125% of the second mutual voltage transformation ratio.

5. The multi-mode wireless power transmitter of claim 1, wherein the first transmit coil and second transmit coil are configured such that a third mutual voltage transformation ratio for the first device misaligned within the designated charging area by one-half a minor diameter of the first transmit coil is between approximately 75% and approximately 125% of the first mutual voltage transformation ratio.

6. The multi-mode wireless power transmitter of claim 1, wherein windings of the first transmit coil do not cross windings of the second transmit coil.

7. The multi-mode wireless power transmitter of claim 1, wherein the first frequency is approximately 6.78 MHz and the second frequency is between approximately 80 kHz and approximately 300 kHz.

8. The multi-mode wireless power transmitter of claim 1, further comprising at least one power converter arranged to drive the first transmit coil and the second transmit coil, wherein a common electrical connection is made to the first transmit coil, the second transmit coil, and the at least one power converter.

9. The multi-mode wireless power transmitter of claim 1, further comprising a first magnetic backing located on a first side of the first transmit coil opposite the platform.

10. The multi-mode wireless power transmitter of claim 9, wherein the first magnetic backing covers at least a portion of the first area but does not extend more than 10% beyond a lateral dimension of the first area.

11. The multi-mode wireless power transmitter of claim 9, wherein the first magnetic backing has a relative magnetic permeability between approximately 60 and approximately 200.

12. The multi-mode wireless power transmitter of claim 9, further comprising a second magnetic backing located on a first side of the second transmit coil opposite the platform.

13. The multi-mode wireless power transmitter of claim 12, wherein the second magnetic backing covers at least a portion of the second area but does not extend more than 10% beyond a lateral dimension of the second area.

14. The multi-mode wireless power transmitter of claim 12, wherein the first magnetic backing has a relative magnetic permeability between approximately 60 and approximately 200 and the second magnetic backing has a relative magnetic permeability between approximately 400 and approximately 500,000.

15. The multi-mode wireless power transmitter of claim 12, wherein the second transmit coil and second magnetic backing are located a vertical distance toward the platform from the first magnetic backing that is greater than zero but less than approximately 25% of a minor diameter of the first magnetic backing.

16. The multi-mode wireless power transmitter of claim 12, wherein the second transmit coil and second magnetic backing are located a vertical distance toward the platform from the first magnetic backing that is greater than zero but less than approximately 25% of a minor diameter of the first transmit coil.

17. The multi-mode wireless power transmitter of claim 1, wherein the second transmit coil is located between approximately 2 mm and approximately 4 mm from the first transmit coil, and the platform is located less than approximately 12 mm from the first transmit coil.

18. The multi-mode wireless power transmitter of claim 1, wherein the second transmit coil is located between approximately 9 mm and approximately 12 mm from the first transmit coil, and the platform is located less than approximately 12 mm from the first transmit coil.

19. The multi-mode wireless power transmitter of claim 1, further comprising a third transmit coil spanning a third area that is approximately equal to the second area, wherein the third transmit coil is configured for operation at the second frequency and is located within the first area.

20. The multi-mode wireless power transmitter of claim 19, wherein the third transmit coil overlaps a portion of the second transmit coil.

21. A method of operating a dual-mode wireless transmitter, the method comprising:
   applying a first drive signal at a first frequency to a first transmit coil that spans a first area and that is vertically spaced from a platform having a designated charging area;
   applying a second drive signal at a second frequency that is at least a factor of 20 lower than the first frequency to a second transmit coil that spans a second area that is located within the first area and is smaller than the first area; and
   transferring power from the first transmit coil to a first wireless receiving device located centrally within the designated charging area, so that the first wireless receiving device exhibits a first mutual voltage transformation ratio; and
   transferring power from the second transmit coil to a second wireless receiving device located centrally within the designated charging area, so that the second wireless receiving device exhibits a second mutual voltage transformation ratio, wherein the first mutual voltage transformation ratio is between approximately 50% and approximately 200% of the second mutual voltage transformation ratio.

22. The method of claim 21, further comprising transferring power from the first transmit coil to the first wireless receiving device misaligned within the designated charging area by one-half a minor diameter of the first transmit coil, so that the first wireless receiving device exhibits a third mutual voltage transformation ratio that is between approximately 50% and approximately 150% of the first mutual voltage transformation ratio.

23. The method of claim 22, further comprising transferring power from the second transmit coil to the second wireless receiving device misaligned within the designated charging area by one-half a minor diameter of the first transmit coil, so that the fourth wireless receiving device exhibits a mutual voltage transformation ratio that is between approximately 50% and approximately 150% of the first mutual voltage transformation ratio.

24. The method of claim 21, wherein the first frequency is approximately 6.78 MHz and the second frequency is between approximately 80 kHz and approximately 300 kHz.

25. The method of claim 21, further comprising condensing magnetic field from the first coil with a first magnetic backing located on a first side of the first transmit coil opposite the platform, wherein the first magnetic backing has a relative magnetic permeability between approximately 60 and approximately 200.

26. The method of claim 25, further comprising condensing magnetic field from the second coil with a second magnetic backing located on a first side of the second transmit coil opposite the platform, wherein the second magnetic backing has a relative magnetic permeability between approximately 400 and approximately 500,000.

27. The method of claim 21, wherein the second transmit coil and second magnetic backing are located a vertical distance toward the platform from the first magnetic backing that is greater than zero but less than approximately 25% of a minor diameter of the first magnetic backing.

28. The method of claim 27, where the second drive signal is applied to the second and the third transmit coils via at least one common wire connected to the first and the second transmit coils.

29. The method of claim 27, where the second drive signal is applied to the second and the third transmit coils via at least one common wire connected to the second and the third transmit coils.

30. The method of claim 21, wherein the second transmit coil and second magnetic backing are located a vertical distance toward the platform from the first magnetic backing that is greater than zero but less than approximately 25% of a minor diameter of the first transmit coil.

31. The method of claim 21, further comprising applying the second drive signal at the second frequency to a third transmit coil that spans a third area that is located within the first area and is smaller than the first area.

\* \* \* \* \*